May 2, 1933.                 B. W. KEESE                  1,906,613
                DOUBLE REDUCTION DUAL DRIVING AXLE UNIT
                     Filed Aug. 30, 1930        2 Sheets-Sheet 1
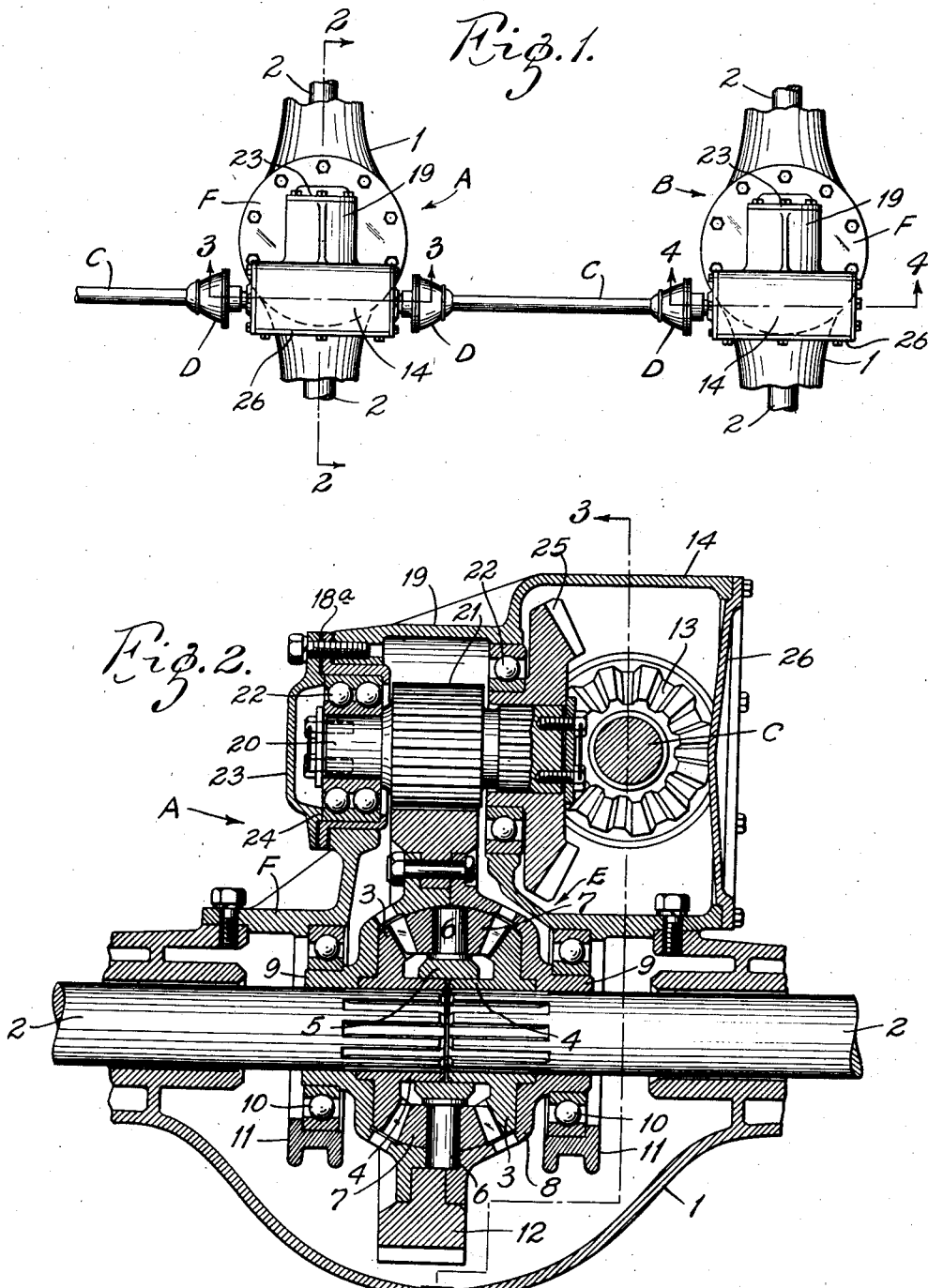

May 2, 1933.  B. W. KEESE  1,906,613
DOUBLE REDUCTION DUAL DRIVING AXLE UNIT
Filed Aug. 30, 1930  2 Sheets-Sheet 2
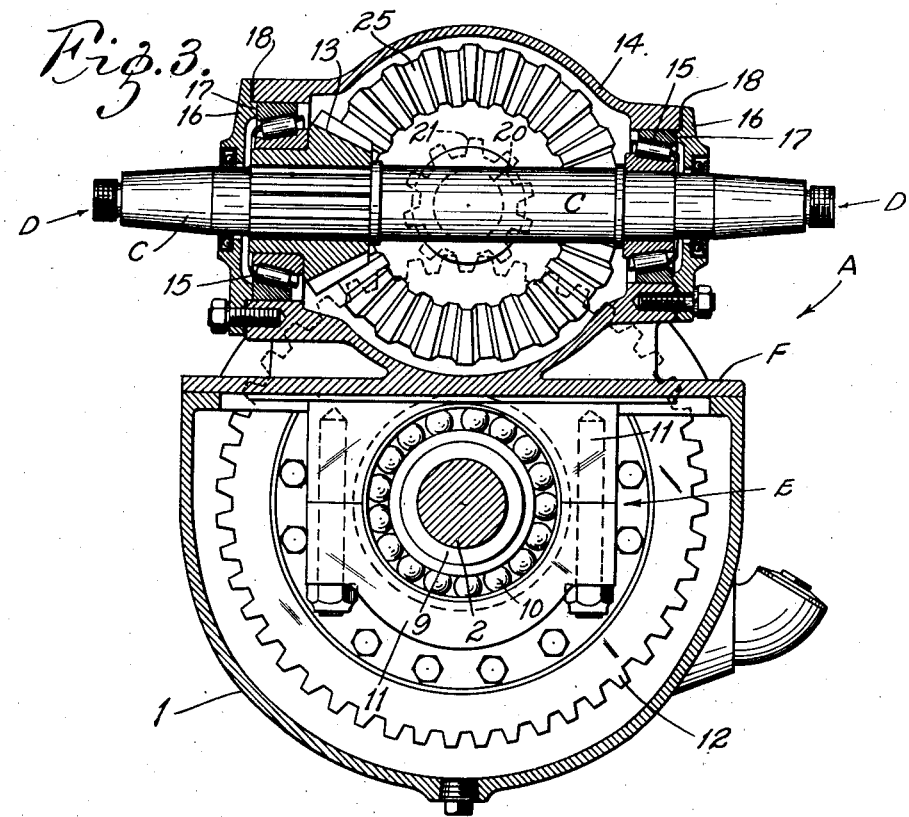
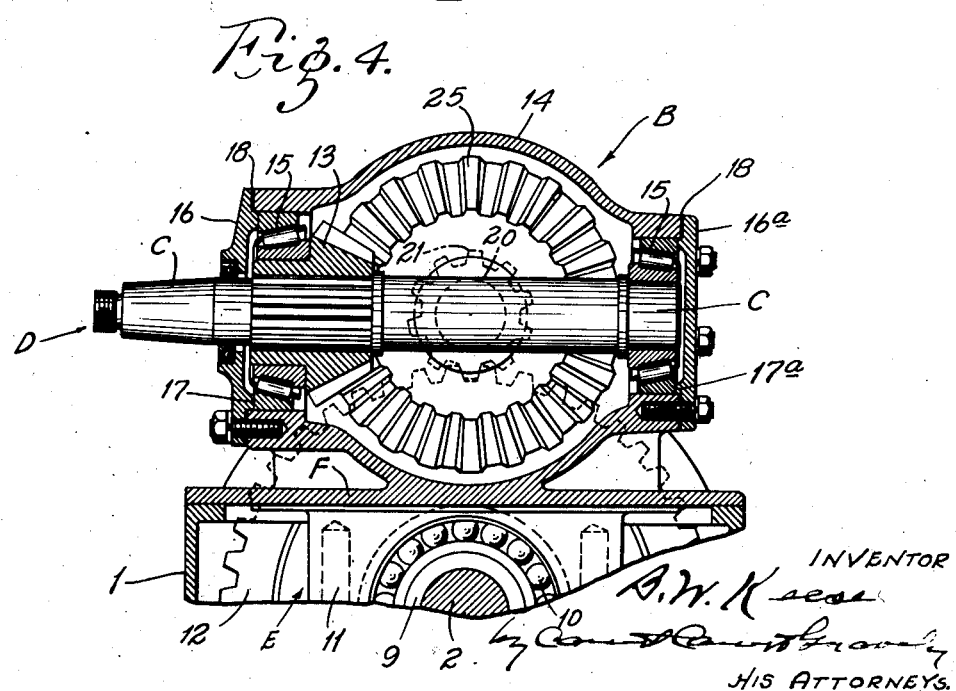
INVENTOR
B. W. Keese
HIS ATTORNEYS.

Patented May 2, 1933

1,906,613

UNITED STATES PATENT OFFICE

BEVERLY W. KEESE, OF OSHKOSH, WISCONSIN, ASSIGNOR TO THE TIMKEN-DETROIT AXLE COMPANY, OF DETROIT, MICHIGAN, A CORPORATION OF OHIO

DOUBLE REDUCTION DUAL DRIVING AXLE UNIT

Application filed August 30, 1930. Serial No. 478,843.

This invention relates to double reduction dual driving axle units for motor vehicles. One of the principal objects of the present invention is to provide each driving axle of such units with a removable carrier for all of the driving gears of said axle, whereby all of said gears and their carrier may be readily attached to and detached from the driving axle as a unit. Another object is a mounting for the gears and their bearings which permits of ready inspection and removal of said gears and adjustment of said bearings, which is rigid, which will shorten the span between bearings, and which will secure a more accurate gear contact. Another object is to adapt the gear carrier for use with a conventional axle housing. Other objects are fewness of parts, simplicity and cheapness of construction and compactness of design. The invention consists in the double reduction dual driving axle unit, and in the construction and arrangements of parts hereinafter described and claimed.

In the accompanying drawings, which form part of this specification and wherein like symbols refer to like parts wherever they occur, Fig. 1 is a plan view of the middle portion of a double reduction dual driving axle unit embodying my invention;

Fig. 2 is a vertical longitudinal section through the front driving axle of said unit on the line 2—2 in Fig. 1;

Fig. 3 is a vertical transverse section through the front driving axle on the line 3—3 in Fig. 2; and Fig. 4 is a vertical transverse section through the upper portion of the rear driving axle on the line 4—4 in Fig. 1.

In the accompanying drawings, my invention is shown in connection with a double reduction dual driving axle unit for a motor vehicle. Said unit comprises two double reduction differential driving axles, one forward or through drive axle A and one rear or final drive axle B, the construction of the two axles being substantially the same. The two axles are driven by a sectional drive or propeller shaft C which extends from the usual change speed transmission gear (not shown) through the front axle A to the rear axle B with its sections connected together by suitable universal joints D. Each of the driving axles A and B comprises a conventional load carrying axle housing 1, which has tubular end portions adapted to receive axially alined driving axle sections 2 and an enlarged bowl or pot shaped middle portion forming a chamber adapted to receive a differential mechanism E through an opening located preferably in the top of said chamber. A gear carrier unit F is removably secured to the top of the bowl shaped middle portion of the axle housing 1 and supports the differential mechanism E and the drive gearing therefor, said gear carrier covering the opening in the bowl shaped middle portion of said axle housing.

The differential mechanism E for each driving axle comprises two opposed bevel driving side gears 3, which are splined or otherwise removably secured to the adjacent inner ends of the driving axle sections 2 of said axle. The differential side gears 3 have hubs 4 extending towards each other that are journaled in a bearing provided therefor in a spider 5. The differential spider 5 has radially extending stub shafts 6 on which are rotatably mounted bevel pinions 7 that intermesh with the two bevel side gears 3. The spider 5, bevel pinions 7 and side gears 3 of the differential are all enclosed within a housing 8 having axially alined oppositely extending hubs 9 that are adapted to rotatably receive the adjacent inner end portions of the driving axle sections 2. The hubs 9 of the differential housing 8 are journaled in suitable anti-friction bearings, preferably ball bearings 10, provided therefor in split pedestals 11 depending from the differential gear carrier F. The differential housing 8 has a large ring gear 12 fixed thereto that is driven from the sectional through drive propeller shaft C by means of reduction gearing hereinafter described.

As shown in the drawings, the sectional propeller or drive shaft C comprises two end sections, each of which has a bevel pinion 13 splined or otherwise removably secured thereto, and an intermediate section connecting the two end sections. The gear carrier F for each driving axle is provided at its top and at one side of the transverse center line of said axle with a housing 14 adapted to receive one of the end sections of the drive shaft C and its bevel pinion 13 through openings at the ends of said housing. Each end section of the main drive shaft C is rotatably supported near its opposite ends in tapered roller bearings 15 mounted in the openings in the ends of the housing 14 of the gear carrier which supports said end section. Both ends of the housing 14 of the gear carrier for the front driving axle A, and the front end of the housing 14 of the gear carrier for the rear driving axle B, are closed by annular closure plates or rings 16 that surround the end sections of the through drive shaft C and have annular ribs 17 that abut against the cups of the roller bearings 15 which support said sections. The rear end of the housing 14 of the gear carrier for the rear driving axle B is closed by means of a solid closure member or cap 16$^a$ that has an annular rib 17$^a$ that abuts against the cup of the bearing 15 in said end of said housing. Shims 18 are interposed between the ends of the housing 14 and the closure rings 16 and 16$^a$ so as to permit adjustment of the tapered bearings 15.

The differential carrier F for each driving axle is also provided at its top and at one side of the propeller shaft housing 14 with a housing 19, which extends at right angles to the propeller shaft C and is adapted to receive a shaft 20 through openings at the ends of said housing. The shaft 20, which extends at right angles to the propeller shaft C, has a spur pinion gear 21 thereon and is rotatably supported near each end in anti-friction bearings, preferably ball bearings 22, mounted in the openings in the ends of the housing 19. The pinion shaft receiving opening at the inner end of the housing 19 is located in the wall that separates said housing from the propeller shaft housing 14, whereby the two housings communicate with each other. The other or outer end of the pinion shaft housing 19 is closed by means of a solid closure member or cap 23 that has an annular rib 24 that abuts against the cup of the bearing 22 in said end of said housing. Shims 18$^a$ are interposed between the closure cap 23 and the housing 19 so as to permit adjustment of the pinion shaft 20 and its bearings 22. The pinion shaft housing 19 is provided at its bottom with an opening adapted to accommodate the upper portion of the spur gear ring 12 of the differential mechanism; and the inner end of the pinion shaft 20 projects into the propeller shaft housing 14 and has a bevel gear 25 splined or otherwise removably secured thereon which intermeshes with and is driven by the bevel pinion 13 on the adjacent end section of the propeller shaft C. The housing 14 for the propeller shaft section and its bevel pinion 13 is provided opposite the bevel gear 25 on the pinion shaft 20 with an opening, which is closed by a cap 26 and through which said bevel gear may be inserted in and removed from the housing 14.

By the arrangement described, power is transmitted from the sectional through drive propeller shaft C to each driving axle in the gear carrier of each driving axle to the spur pinion shaft 20 and thence through the differential gearing E of said axle to the two axle shafts 2 thereof. The two axle shafts of each driving axle are differentially driven from the sectional through drive propeller shaft C; and a double speed reduction is obtained between said propeller and said axle shafts, the first speed reduction being obtained by means of the intermeshing bevel pinion 13 and bevel gear 25 on the end sections of the propeller shaft C and pinion shaft, respectively, and the other speed reduction being obtained by means of the spur gear pinion 21 on the pinion shaft 20 and the spur gear ring 12 on the differential housing 8.

The hereinbefore described double reduction dual driving axle unit has numerous advantages. All of the gears and their bearings, together with one section of the propeller shaft, are mounted in a common gear carrier and are readily removable therewith from the axle housing as a unit, thereby securing greater accuracy in machining, greater rigidity of the parts and more accurate gear contact. The shafts, the gears thereon and the bearings therefor are also separately removable from the gear carrier; whereby said gears may be readily replaced when worn or when it is desired to obtain a different speed ratio. The arrangement for mounting the gear shafts in the carrier also secures a short span between the shaft bearings and thereby eliminates deflection of the gears. It is noted that the gear carriers for the two axles are of substantially the same construction, the only difference being that the propeller shaft housing of the gear carrier for the rear or final drive axle is closed by means of a solid cap instead of a ring. It is also noted that the construction of the gear carrier permits its use with load carrying axle housings of standard design.

Obviously, the hereinbefore described construction admits of considerable modification, and I do not wish to be limited to the precise details of construction shown and described.

What I claim is:

1. A double reduction dual driving axle unit comprising two differential driving axles and a sectional propeller shaft comprising end and intermediate sections extending from axle to axle, each of said axles comprising a load carrying housing located below said propeller shaft, driving axle sections in said housing, differential mechanism operatively connecting said axle sections, a spur ring gear for driving said differential mechanism, a carrier removably secured to the top of said axle housing and supporting said differential mechanism therein, one of the end sections of said propeller shaft being journaled in said carrier, a pinion shaft journaled in said carrier at right angles to and at one side of said end section, a bevel pinion on said end section, a bevel gear and a spur pinion on said pinion shaft intermeshing respectively with the bevel gear on said end section and the spur gear driving ring of the differential mechanism, a bearing mounted in said carrier between said bevel gear and said spur pinion gear for rotatably supporting said pinion shaft, and means whereby said bevel gear is adapted to be inserted in and removed from said carrier without removing said carrier from said housing.

2. A double reduction dual driving axle unit comprising two differential driving axles and a sectional propeller shaft comprising end and intermediate sections extending from axle to axle, each of said axles comprising a load carrying housing located, below said propeller shaft, driving axle sections in said housing, differential mechanism operatively connecting said axle sections, a spur ring gear for driving said differential mechanism, a carrier removably secured to the top of said axle housing and supporting said differential mechanism therein, one of the end sections of said propeller shaft being journaled in said carrier, a pinion shaft journaled in said carrier at right angles to and entirely on one side of said end section, a bevel pinion on said end section, and a bevel gear and a spur pinion on said pinion shaft intermeshing respectively with the bevel gear on said end section and the spur gear driving ring of the differential mechanism, said propeller shaft end section and said pinion shaft and the gears thereon being all housed within said carrier and removable therewith from said axle housing as a unit, and means whereby said bevel gear is adapted to be inserted in and removed from said carrier without disturbing said spur pinion or said differential mechanism.

3. A double reduction dual driving axle unit comprising two differential driving axles and a sectional propeller shaft extending from axle to axle, and comprising end and intermediate sections and a bevel pinion on each of said end sections, each of said axles comprising a load supporting housing and located below said propeller shaft, driving axle sections in said housing, differential mechanism operatively connecting said axle sections and provided with a spur gear ring, a pinion shaft disposed substantially at right angles to and at one side of one of the end sections of said sectional propeller shaft and provided with a spur pinion and a bevel gear intermeshing respectively with said differential spur gear ring and the bevel pinion on said end section, and a carrier removably secured to said load supporting housing and supporting said differential mechanism and the spur gear drive ring therefor, said carrier being provided with a separate oil containing housing adapted to enclose said bevel pinion and said bevel gear, said housing having an opening therein through which said bevel gear is adapted to be inserted in and removed from said housing without removing said carrier therefrom and without disturbing said spur gearing or said differential mechanism.

4. A double reduction dual driving axle unit comprising two differential driving axles and a sectional propeller shaft extending from axle to axle and comprising end and intermediate sections and a bevel pinion on each of said end sections, each of said axles comprising a load supporting housing located below an end section, driving axle sections in said housing, differential mechanism operatively connecting said axle sections and provided with a spur gear ring, a pinion shaft disposed substantially at right angles to one of the end sections of said sectional propeller shaft entirely to one side thereof and provided with a spur pinion and a bevel gear intermeshing respectively with said differential spur gear ring and the bevel pinion on said end section, a carrier removably secured to said load supporting housing and supporting said differential mechanism and the spur gear drive ring therefor, said carrier being provided with a separate oil containing housing adapted to enclose said bevel pinion and said bevel gear, an antifriction bearing mounted in one wall of said housing between said spur pinion and said bevel gear for rotatably supporting said pinion shaft, said housing having an opening in the outer wall thereof through which said bevel gear and said antifriction bearing are adapted to be inserted in and removed from said housing.

5. A double reduction dual driving axle unit comprising two differential driving axles and a sectional propeller shaft extending from axle to axle, and comprising end and intermediate sections and a bevel pinion on each of said end sections, each of said axles comprising a load supporting housing, driving axle sections in said axle housing, differential mechanism operatively connecting said axle sections and provided with a spur gear ring, a carrier removably secured to said axle housing and supporting said differential gearing and having an oil containing housing adapted to receive one of the end sections of said propeller shaft and the bevel pinion thereon through openings in the ends of said housing, antifriction bearings interposed between said housing and said end section, a pinion shaft disposed at right angles to said end section at one side thereof and provided with a spur gear pinion and a bevel gear intermeshing respectively, with the spur gear ring of the differential and the bevel pinion on said end section, said carrier being provided with a housing adapted to receive through openings in the ends thereof said pinion shaft and the pinion thereon, and antifriction bearings interposed between said pinion shaft and the housing therefor, said pinion shaft housing communicating with said end section housing through the opening in one side wall of the former, and said pinion shaft extending through said opening with the bevel gear thereon located in said end section housing and removable therefrom through an opening in the other side thereof, and a removable cap for said opening.

6. A gear carrier for a double reduction differential driving axle, said carrier comprising a portion adapted to be attached to the axle housing, a differential gear case journaled in said carrier, a spur gear on said differential gear case at the transverse center line thereof, a pinion shaft journaled in said carrier, a spur pinion on said pinion shaft intermeshing with said spur gear, a bevel gear on said pinion shaft, a propeller shaft journaled at both ends in said carrier, and a bevel pinion on said propeller shaft intermeshing with the bevel gear on said pinion shaft, said propeller shaft extending at right angles to said pinion shaft across one end thereof, said gear carrier being provided with a separate oil containing housing for enclosing said bevel pinion and said bevel gear, said housing having an opening therein through which said bevel gear is adapted to be inserted in and removed from said housing without removing said pinion shaft, said spur pinion or said differential gear case from said carrier.

Signed at Oshkosh, Wisconsin, this 26 day of Aug., 1930.

BEVERLY W. KEESE.